(12) United States Patent
Johnson et al.

(10) Patent No.: US 9,804,748 B2
(45) Date of Patent: Oct. 31, 2017

(54) SCALE SENSITIVE TREATMENT OF FEATURES IN A GEOGRAPHIC INFORMATION SYSTEM

(71) Applicant: Google Inc., Mountain View, CA (US)

(72) Inventors: Kirk Johnson, Boulder, CO (US); Yan Mayster, Aurora, CO (US); Georgi Tsankov, Boulder, CO (US)

(73) Assignee: Google Inc., Mountain View, CA (US)

(*) Notice: Subject to any disclaimer, the term of this patent is extended or adjusted under 35 U.S.C. 154(b) by 178 days.

(21) Appl. No.: 14/135,622

(22) Filed: Dec. 20, 2013

(65) Prior Publication Data

US 2015/0128089 A1 May 7, 2015

Related U.S. Application Data

(60) Provisional application No. 61/898,557, filed on Nov. 1, 2013.

(51) Int. Cl.
*G06F 3/0484* (2013.01)
*G06F 17/30* (2006.01)

(52) U.S. Cl.
CPC ...... *G06F 3/0484* (2013.01); *G06F 17/30241* (2013.01); *G09G 2340/0407* (2013.01)

(58) Field of Classification Search
CPC ............ G06F 3/0484; G06F 17/30241; G09G 2340/0407
See application file for complete search history.

(56) References Cited

U.S. PATENT DOCUMENTS

| | | | |
|---|---|---|---|
| 8,095,434 B1 * | 1/2012 | Puttick | G06F 17/30241 705/26.9 |
| 8,429,156 B2 | 4/2013 | Buchmueller et al. | |
| 8,510,349 B1 * | 8/2013 | Puttick | G06F 7/00 707/805 |
| 8,538,956 B1 | 9/2013 | Szabadka et al. | |
| 2005/0270311 A1 * | 12/2005 | Rasmussen | G01C 21/32 345/677 |
| 2006/0271280 A1 * | 11/2006 | O'Clair | G06F 17/3087 701/455 |
| 2008/0104027 A1 * | 5/2008 | Imler | G06F 17/30241 |
| 2008/0291201 A1 * | 11/2008 | Lafon | G06T 15/205 345/427 |
| 2009/0112816 A1 * | 4/2009 | Marlow | G06F 17/30241 |
| 2009/0132469 A1 * | 5/2009 | White | G06Q 10/00 |

(Continued)

FOREIGN PATENT DOCUMENTS

WO  WO 2013/154523  10/2013

*Primary Examiner* — Nicholas Klicos
(74) *Attorney, Agent, or Firm* — Dority & Manning, P.A.

(57) ABSTRACT

Systems and methods for presenting information in response to a user interaction with a geographic image at a point of query in a geographic information system are provided. A user can request information at point of query in the geographic image. Responsive to the user request, the geographic information system can search for and obtain information associated with the request. As part of the logic used to return information responsive to a request at a point of query, a zone of influence can be defined for one or more features depicted in the image. The zone of influence can be defined by a pixel threshold in a pixel space associated with the geographic image. The pixel threshold can be constant across a plurality of zoom levels of the geographic image.

14 Claims, 6 Drawing Sheets

(56) References Cited

U.S. PATENT DOCUMENTS

| | | | |
|---|---|---|---|
| 2009/0326815 A1* | 12/2009 | Williamson | G01C 21/367 |
| | | | 701/455 |
| 2010/0094548 A1* | 4/2010 | Tadman | G01C 21/36 |
| | | | 701/533 |
| 2010/0191797 A1* | 7/2010 | Seefeld | G06F 17/3087 |
| | | | 709/203 |
| 2010/0257162 A1 | 10/2010 | Buron et al. | |
| 2011/0055290 A1* | 3/2011 | Li | G06F 17/30241 |
| | | | 707/807 |
| 2011/0137881 A1* | 6/2011 | Cheng | G06F 17/3087 |
| | | | 707/706 |
| 2011/0264370 A1* | 10/2011 | Jakobson | G08G 1/0969 |
| | | | 701/533 |
| 2012/0309410 A1* | 12/2012 | Marti | H04W 4/028 |
| | | | 455/456.1 |
| 2012/0329519 A1* | 12/2012 | Bliss | G01C 21/367 |
| | | | 455/556.2 |
| 2013/0006957 A1* | 1/2013 | Huang | G06F 3/017 |
| | | | 707/706 |
| 2013/0069990 A1* | 3/2013 | Geise | G06F 3/0485 |
| | | | 345/660 |
| 2013/0219308 A1* | 8/2013 | Britton | G06F 3/0488 |
| | | | 715/764 |
| 2013/0298083 A1* | 11/2013 | Bertoldo | G06F 3/0482 |
| | | | 715/835 |
| 2013/0304379 A1* | 11/2013 | Fulger | G01C 21/3415 |
| | | | 701/533 |
| 2015/0088853 A1* | 3/2015 | McDonald | G06F 17/30038 |
| | | | 707/711 |

* cited by examiner

SCALE SENSITIVE TREATMENT OF FEATURES IN A GEOGRAPHIC INFORMATION SYSTEM

PRIORITY CLAIM

The present application claims the benefit of priority of U.S. Provisional Patent Application Ser. No. 61/898,557, titled Scale Sensitive Treatment of Features in a Geographic Information System, filed Nov. 1, 2013, which is incorporated by reference herein.

FIELD

The present disclosure relates generally to geographic information systems, and more particularly to providing information responsive to a user interaction at a point of query in a geographic information system.

BACKGROUND

Geographic information systems provide for the archiving, retrieving, and manipulating of data that has been stored and indexed according to geographic coordinates of its elements. A geographic information system generally includes a variety of data types, including imagery, maps, tables, vector data (e.g. vector representations of roads, parcels, buildings, etc.), three-dimensional models, and other data. Improvements in computer processing power and broadband technology have led to the development of interactive geographic information systems that allow for the navigating and displaying of geographic imagery, such as map imagery, satellite imagery, aerial imagery, panoramic imagery, three-dimensional models, and other geographic imagery. Users can use a geographic information system to search for, view, receive travel directions to, and otherwise navigate a particular point of interest.

Geographic information systems can include a database of information associated with features depicted in the geographic imagery. Such information can include information such as addresses, business names, hours of operation, restaurant menus, user reviews, and other information. A user of an interactive geographic information system can request information associated with a particular feature by interacting with geographic information at a point of query. For instance, a user can click or tap on a geographic image at the point of query. Alternatively, the point of query can be associated with a user device location.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for presenting information in conjunction with a point of query. The method includes receiving, by one or more computing devices, a request for information at a point of query. The point of query is associated with a geographic location. Responsive to the request, the method includes obtaining, by the one or more computing devices, information associated with a feature located proximate to the point of query. The feature has a zone of influence encompassing the point of query. The zone of influence defines a region in a geographic image depicting the feature. The method further includes providing for display, by the one or more computing devices, the information associated with the feature in the user interface. The zone of influence of the feature is defined by a pixel threshold in a pixel space associated with the geographic image. The pixel threshold is defined irrespective of the scale of the geographic image. For instance, the pixel threshold can be defined to be constant across a plurality of zoom levels of the geographic image.

Other aspects of the present disclosure are directed to systems, apparatus, tangible, non-transitory computer-readable media, user interfaces and devices for presenting information responsive to a point of query in a geographic information system.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
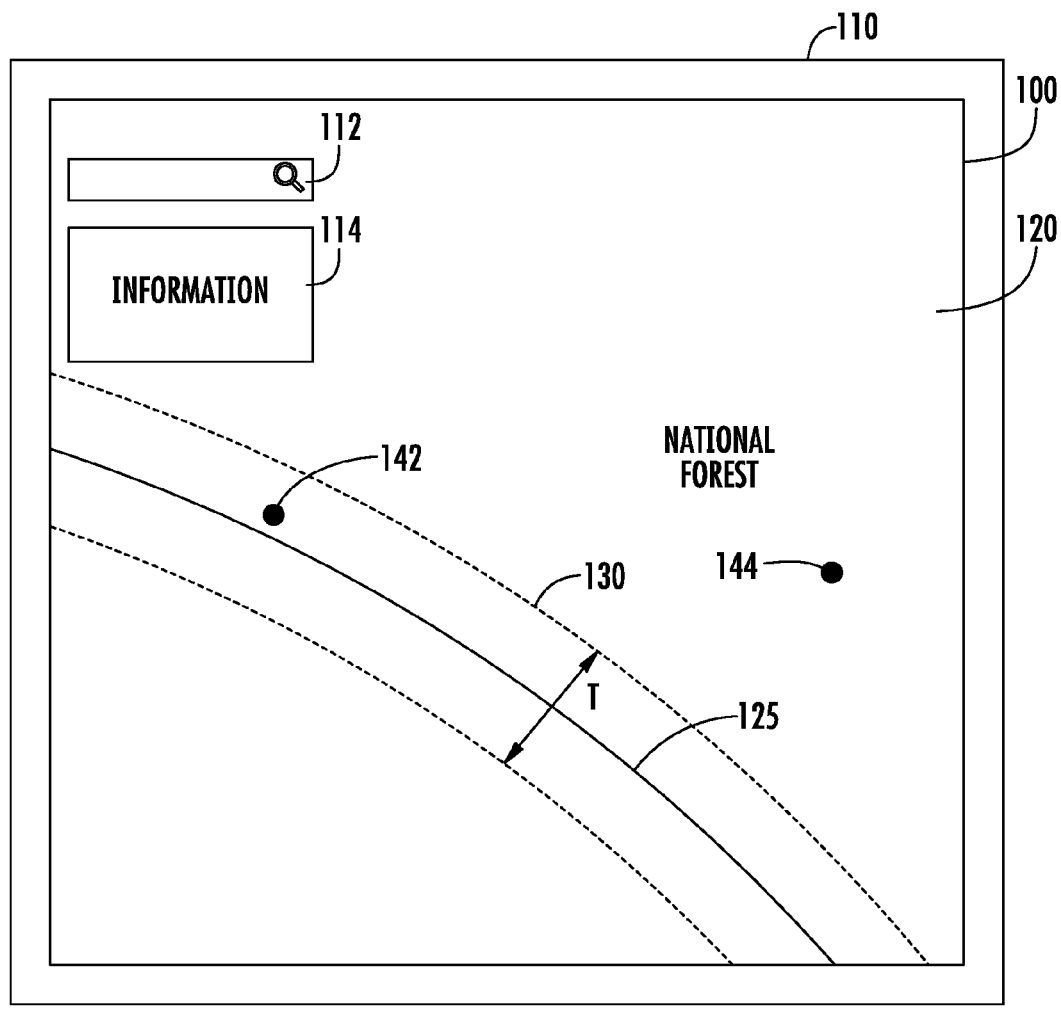
FIG. 1 depicts an example user interface presenting geographic imagery at a first zoom level according to example embodiments of the present disclosure.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Generally, example aspects of the present disclosure are directed to presenting information in response to a request for information at a point of query in a geographic information system. More particularly, a geographic information system can present a geographic image in a user interface on a display device. The geographic image can include any suitable representation of a geographic area, including a map image, satellite image, aerial image, panoramic image, three-dimensional model, or other suitable image of a geographic area. One or more features can be depicted in the geographic area. The features can be any objects, items, or entities that are depicted in the geographic image including, but not limited to, roads, buildings, monuments, traversable paths, bodies of water, points of interest, and other features.

Point of query requests can request information about various features in a geographic area at or near a point of query. The point of query refers to the geographic location associated with the request. For instance, a user can click or tap a geographic image at a point of query (e.g. a particular location on the geographic image) to request information associated with the geographic image at the point of query. Alternatively, a mobile device location (e.g. as determined by a positioning system such as a GPS system, WiFi triangulation, etc.) can be used to request information from a geographic information system about the mobile device location at the point of query. Responsive to the point of query request, the geographic information system can search for and obtain information associated with the point of query. The information can then be presented in the user interface to the user.

A zone of influence can be defined for one or more features depicted in the image. The zone of influence can define a region in the geographic image associated with the feature. For instance, a zone of influence can define a "clickable region" about the feature such that when a user clicks or taps at a point of query within the zone of influence, the geographic information system can return information associated with the feature. The zone of influence can also define a boundary for returning information associated with a feature based on a mobile device location.

As part of the logic used to return information responsive to a request at a point of query, the geographic information system can match features with the point of query based at least in part on the zone of influence encompassing the point of query. For instance, information associated with the particular feature can be ranked or prioritized higher relative to other information (e.g. information associated with other different nearby features) when identifying responsive information if the point of query is encompassed by the zone of influence of the particular feature.

A geographic image can have different scales depending on the zoom level of the geographic image. In addition, certain geographic images, such as aerial images, can have a varying physical scale across the geographic image. Defining the zone of influence in a physical space (e.g. the physical dimensional represented by the geographic image) can cause scaling issues for the zone of influence when viewing the geographic image at different scales. For instance, a zone of influence defined by a fixed physical threshold of, for instance, 10 meters, can make sense when 10 meters corresponds to a reasonable number of pixels (e.g. 10 pixels) at the particular view scale associated with the geographic image. However, as the view scale of the geographic image is adjusted (e.g. a user navigates to a more zoomed-in view), the fixed threshold defined in physical space may no longer be appropriate.

As an example, physical thresholds tend to be defined fairly large (e.g. 100s of meters) to ensure that the corresponding zone of influence in the pixel space is large enough to be useful at moderate zoom levels of the imagery (e.g. perhaps 10 pixels wide). At more zoomed-in levels, this fixed distance threshold can cause the zone of influence to become excessively large (e.g. 100s of pixels wide), leading to a situation in which point of query requests that are quite some distance from a feature still return information associated with the feature.

According to example aspects of the present disclosure, the zone of influence of a feature is defined in a pixel space associated with the geographic image. For example, the zone of influence can be defined by a pixel threshold (e.g. a 10 pixels) instead of a physical distance (e.g. 10 meters). The pixel threshold can be defined irrespective of the scale of the geographic image. This can allow for the proper scaling of a zone of influence at different zoom levels of the geographic image and at varying scales within the geographic image itself.

In one embodiment, the pixel threshold can be constant across a plurality of zoom levels of the geographic image. For instance, the zone of influence of a feature can have a fixed pixel dimensions (e.g. 10 pixels) regardless of zoom level. As the user zooms to different zoom levels of the geographic area, the physical distance represented by the fixed pixel threshold will scale according to the appropriate zoom level. As a result, the size of the zone of influence can be automatically tailored for any zoom level of the geographic image. In this manner, point of query requests can be more likely to return relevant information with a feature at or nearby the point of query.

Example Zones of Influence Defined in Pixel Space

FIG. 1 depicts an example user interface 100 that can be presented by a geographic information system on a display 110 of one or more computing devices. A geographic image 120 of a geographic area is depicted in the user interface 100. The user interface 100 can include a search tool 112 that allows a user to search for information associated with the geographic area. For instance, a user can search for points of interest, travel directions, etc., by entering search terms into the search tool 112. Information responsive to the search can be presented in the user interface 100, for instance, in an information window 114.

According to aspects of a present disclosure, a user can request information associated with the geographic area using a suitable user interaction with the geographic image 120 at a point of query. For instance, a user can click or tap at various locations (e.g. points of query) in the geographic image 120 to request information associated with the particular locations depicted in the geographic image 120. More specifically, the geographic image 120 can depict one or more features, such as road feature 125. A user can request information about the road feature 125 by interacting with the geographic image 120 at a point of query at or near the road feature 125.

To properly identify information responsive to a user interaction at a point of query, the geographic information system can define a zone of influence about one or more features depicted in the geographic image. For example, a zone of influence 130 can be defined for the road feature 125 in the geographic image 120. The zone of influence 130 can define an interactive region around the feature 125 in the geographic image. When a user interacts with the geographic image 120 at a location within the zone of influence 130, such as at point of query 142, information associated with the road feature 125 (e.g. the name of the road, the speed limit, the number of lanes, traffic information, etc.)

can be presented in the information window 114. When a user interacts with the geographic image 120 at a location outside the zone of influence 130, such as at point of query 144, information associated with one or more other features can be presented in the information window 114, such as information associated with a national forest.

To ensure that relevant information is returned in response to user interactions at points of query in the geographic information system, the boundaries of the zones of influence of the one or more features need to be properly defined. For instance, the zone of influence 130 can have a boundaries defined by a threshold T. The threshold T can be defined such that information associated with the feature is ranked or prioritized higher when returning results responsive to a point of query within the threshold T defining the zone of influence 130.

According to aspects of the present disclosure, the threshold T is defined in a pixel space associated with the geographic image 120. More particularly, a pixel threshold (e.g. 10 pixels) can be used to define the boundaries of the zone of influence 130 for the feature 125. The pixel threshold can be constant across a plurality of zoom levels of the geographic image 120. By keeping the pixel threshold constant, the zone of influence 130 for the feature 125 can be appropriately scaled to a physical threshold that is suitable for a particular zoom level. For example, a pixel threshold of 10 pixels can correspond to 100s of meters in a physical space associated with first zoom level. The pixel threshold of 10 pixels can correspond to 10s of meters in a physical space associated with the second zoom level.

Figure 2:
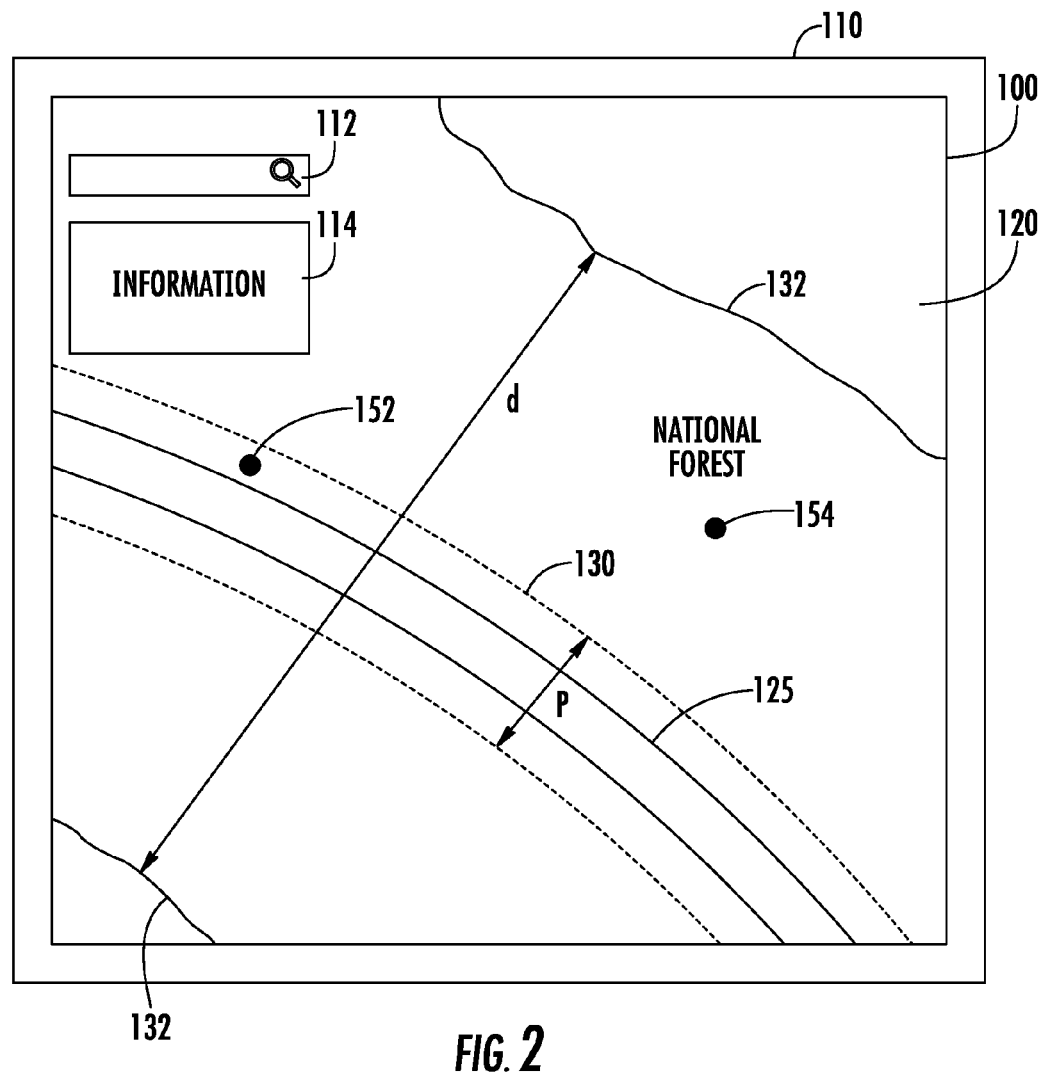
FIG. 2 depicts an example user interface presenting geographic imagery at a second zoom level according to example embodiments of the present disclosure.

FIG. 2 depicts the geographic image 120 zoomed-in closer to the geographic area. As shown, the road feature 125 is more prominent in the geographic image 120 as a result of the camera perspective being zoomed-in closer to the road feature 125. The road feature 125 is still associated with a zone of influence 130. If the zone of influence 130 were defined by a physical threshold d, the zone of influence 130 would be much wider at the more zoomed-in level as indicated by boundaries 132. In this case, a user interaction at point of query 154 can return information associated with the road feature 125, even though the point of query 154 is located over a different feature, namely the national forest.

However, if the zone of influence 130 is defined in a pixel space using a constant pixel threshold p according to aspects of the present disclosure, the boundaries of the zone of influence 130 are appropriately scaled for the zoom level of the geographic image 120. More particularly, a user interaction at point of query 152 can return information associated with the road feature 125. A user interaction at point of query 154 can return other information, such as information associated with the national forest.

The above example is discussed with reference to a point of query request corresponding to a user interaction with a geographic image at a point of query. In other example implementations, the point of query request can be a request for information (e.g. a name of a location, address of a location, etc.) associated with a current mobile device location. More particularly, a mobile device such as a smartphone, tablet, wearable computing device, or other suitable mobile device can determine its geographic location using a suitable positioning system.

Various embodiments discussed herein may access and analyze personal information about users, or make use of personal information, such as position information. In some embodiments, the user may be required to install an application or select a setting in order to obtain the benefits of the techniques described herein. In some embodiments, certain information or data can be treated in one or more ways before it is stored or used, so that personally identifiable information is removed. For example, a user's identity may be treated so that no personally identifiable information can be determined for the user.

A request can be provided to match the location of the mobile device with information about a particular feature in a geographic information system. The location of the mobile device can be considered the point of query. To return information responsive to the request, a feature can be matched with the location of the mobile device based at least in part on a zone of influence associated with the feature. More particularly, if the location of the mobile device is within a zone of influence of a particular feature, the geographic information system can rank or prioritize information associated with the particular feature higher in responding to the point of query request relative to a different feature having a zone of influence that does not encompass the point of query.

The location of the mobile device as determined by the positioning system can be inexact. For instance, the position of the mobile device can be modeled as a center point with a radius indicating the uncertainty of the center point as an estimate of the location of the mobile device. According to aspects of the present disclosure, a geographic information system can be configured to match a feature with a particular point of query request taking into account the uncertainty of the mobile device location.

More specifically, the uncertainty of the location of the mobile device can be used to determine a visual scale for a geographic image in the geographic information system. For instance, more accurate mobile device locations can correspond to a geographic image having a small visual scale (e.g. a more zoomed-in scale). Less accurate mobile device locations can correspond to a geographic image having a larger visual scale (e.g. a more zoomed-out scale). A feature can be matched with the request if the point of query is within a zone of influence of the feature in the geographic image scaled according to the uncertainty of the request.

Because the zone of influence can be defined in a pixel space, for instance, as a constant pixel threshold, the zone of influence can be appropriately scaled depending on the scale of the geographic image corresponding to the uncertainty of the location of the mobile device. In this manner, the geographic information system can be less likely to match a feature that is located distant from a mobile device location when there is more accuracy associated with the mobile device location.

As an example, a location of a mobile device having a large uncertainty can be associated with geographic image having a larger visual scale of for instance, one pixel being equal to 10 meters. A zone of influence having a constant pixel threshold of 10 pixels can correspond to 100s of meters in the scaled image. Accordingly, features that are further away from the estimated location of the mobile device can be matched in response to the request to accommodate the uncertainty in the estimation of the mobile device location. A location of a mobile device having less uncertainty can be associated with a geographic image having a smaller visual scale, for instance, one pixel is equal to 1 meter. A zone of influence having a constant pixel value of 10 pixels can correspond to 10s of meters in the scaled image. As a result, features closer the mobile device are more likely to be matched in response to the point of query request.

Figure 3:
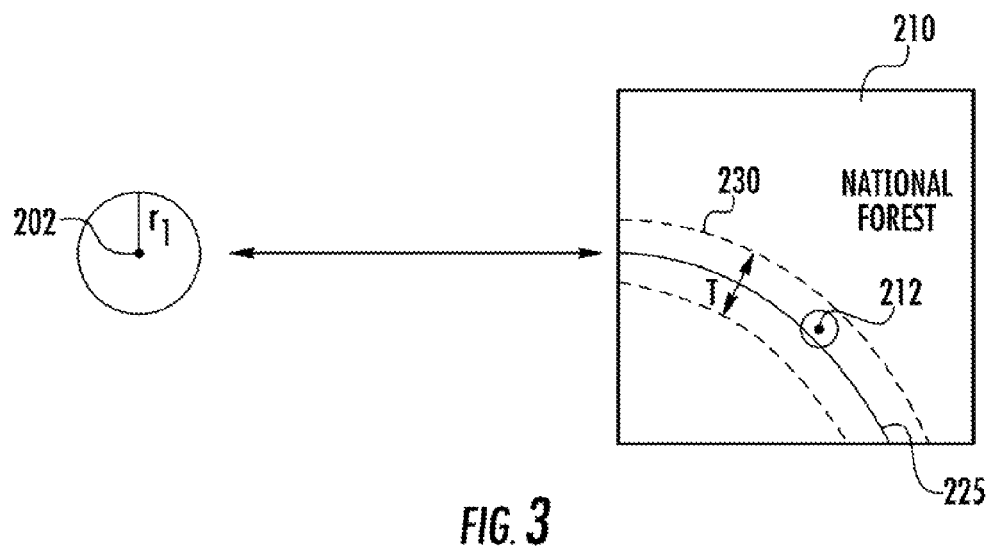
FIG. 3 depicts an example geographic image having a zoom level determined based on a level of uncertainty associated with a mobile device location.

For example, FIG. 3 depicts an example geographic image 210 corresponding to a mobile device location 202. More particularly, the mobile device location 202 can have a level of uncertainty represented by radius $r_1$. To obtain information associated with the mobile device location 202, a request for information associated with a point of query 212 corresponding to the mobile device location 202 can be provided. In response to the request, geographic image 210 having a zoom level corresponding to the level of uncertainty represented by radius $r_1$ can be accessed. The point of query 212 can be identified relative to the geographic image 210 based on the mobile device location 202. The point of query 212 is encompassed by a zone of influence 230 associated with feature 225 in the geographic image 210. Accordingly, information associated with the feature 225 can be ranked or prioritized higher for responding to the request.

Figure 4:
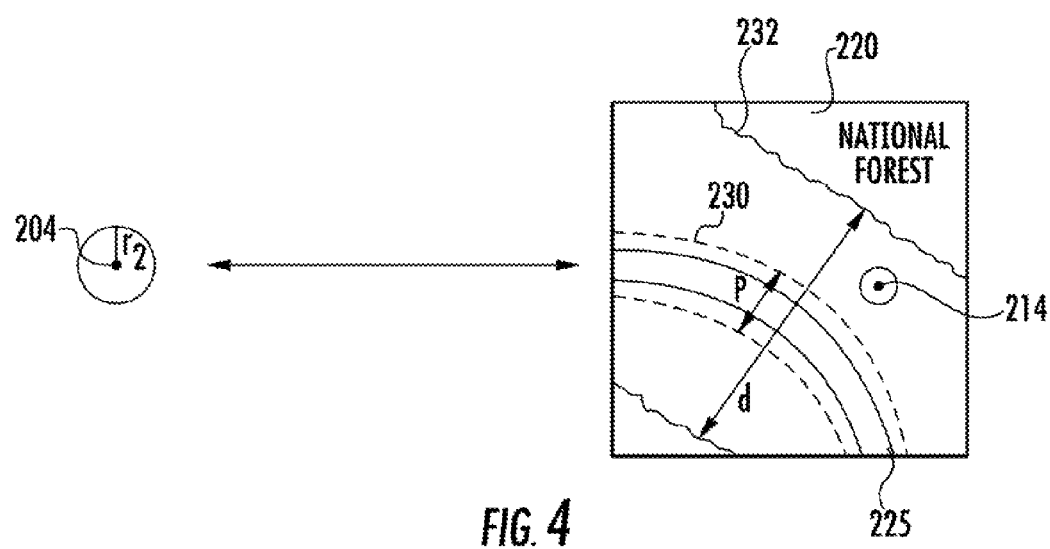
FIG. 4 depicts example geographic image having a zoom level determined based on a different level of uncertainty associated with a mobile device location.

FIG. 4 depicts an example geographic image 220 corresponding to a different mobile device location 204. The mobile device location 204 can have a level of uncertainty represented by radius $r_2$. As illustrated, $r_2$ is less than $r_1$, indicating that the mobile device location 204 is estimated with more accuracy than the mobile device location 202 of FIG. 3. Accordingly, mobile device location 204 can correspond to a geographic image 220 having a more zoomed-in level relative to geographic image 210 of FIG. 3.

Referring to FIG. 4, a point of query 214 corresponding to the mobile device location 204 can be identified relative to the geographic image 220. If the zone of influence 230 for the feature 225 were defined by a physical threshold d, the zone of influence 230 would be much wider at the more zoomed-in geographic image 220 as indicated by boundaries 232. In this scenario, a request associated with point of query 214 can return information associated with the road feature 225, even though the point of query 214 is located at a different feature, namely the national forest. However, if the zone of influence 230 is defined in a pixel space using a constant pixel threshold p according to aspects of the present disclosure, the boundaries of the zone of influence 230 can be appropriately scaled for the zoom level of the geographic image 220. As a result, point of query 214 can return information associated with the national forest.

Example Methods of Presenting Information Associated with Geographic Imagery

Figure 5:
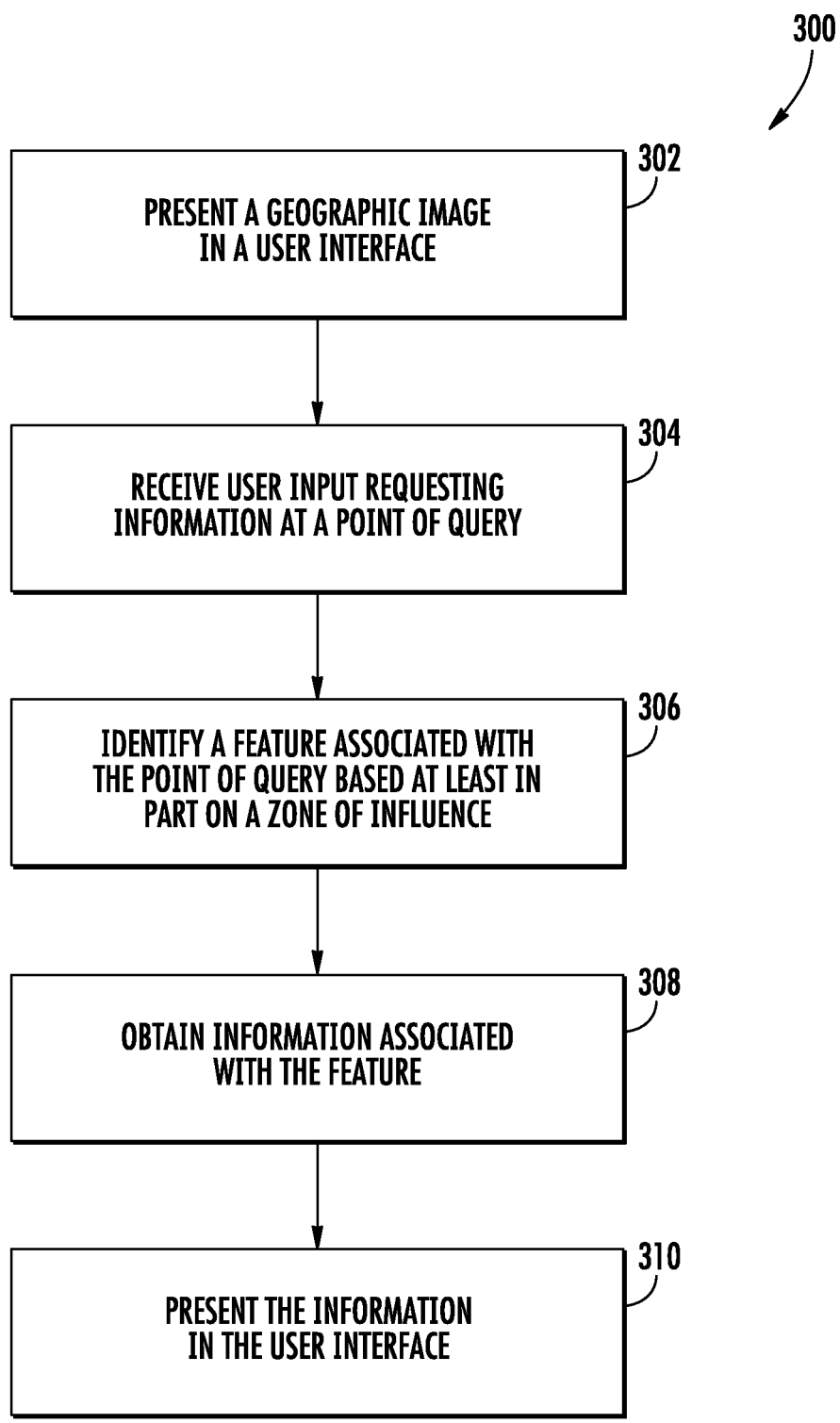
FIG. 5 depicts a flow diagram of a method for presenting information associated with a geographic image according to example embodiments of the present disclosure.
Figure 6:
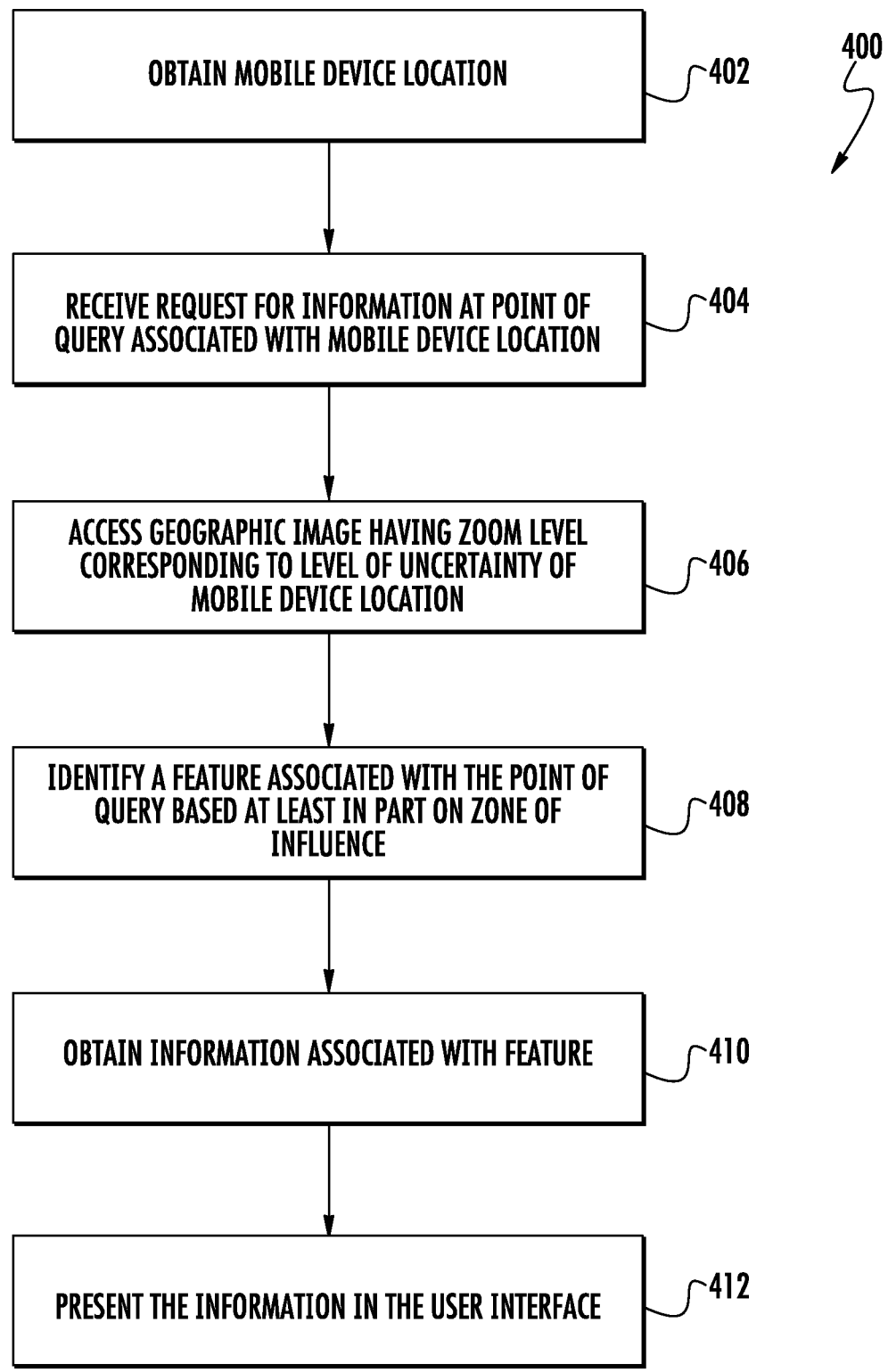
FIG. 6 depicts a flow diagram of a method for obtaining information based at least in part on a mobile device location according to example embodiments of the present disclosure.

FIG. 5 depicts a flow diagram of an example method (300) of presenting information associated with geographic imagery according to an example embodiment of the present disclosure. The method (300) can be implemented by one or more computing devices, such as one or more of the computing devices depicted in FIG. 7. In addition, FIG. 5 depicts steps performed in a particular order for purposes of illustration and discussion. Those of ordinary skill in the art using the disclosures provided herein, will understand that the various steps of any of the methods disclosed herein can be adapted, omitted, expanded and/or rearranged in various ways without deviation from the scope of the present disclosure.

At (302), the method includes presenting a geographic image in a user interface on a display device. For instance, the geographic image 120 of FIG. 1 can be depicted in the user interface 100 on display device 110. The geographic image can depict a geographic area at a particular zoom level. The geographic image can be any suitable image of a geographic image, such as a map image, satellite image, aerial image, panoramic image, three-dimensional model, or other suitable image of a geographic area. In one implementation, the geographic image can be an aerial image providing an oblique view of the geographic area. The visual scale of the geographic image can vary across the displayed view. The geographic image can include a plurality of pixels. Each pixel can be associated with a color value and other information (e.g. lat/lon/alt coordinates). The pixels of the geographic image can collectively provide a representation of the geographic area.

At (304) of FIG. 2, a request for information at a point of query can be received. The request can be provided by a user input using a suitable input device, such as a touchscreen, touchpad, mouse, keyboard, or other suitable input device. The user input can include, for instance, clicking or tapping a particular location in the geographic image. For instance, the user can tap one or more pixels of the geographic image using a suitable touch interface. By clicking or tapping the geographic image at a particular point of query, the user can request information associated with the point of query, such as information associated with feature at or near the point of query.

At (306), the method can include identifying or matching a feature associated with the point of query. More particularly, a feature associated with the point of query can be identified based on one or more zones of influence of features depicted in the geographic image. The zone of influence associated with a particular feature can define a region in the geographic image associated with the particular feature. If the point of query is within the zone of influence of the particular feature, information associated with the particular feature can be ranked or prioritized higher relative to other information for responding to the request at the point of query.

According to aspects of the present disclosure, the zone of influence of a particular feature is defined in a pixel space by a pixel threshold (e.g. 10 pixels). The pixel threshold can remain constant across a plurality of zoom levels for the geographic image. In this way, the zone of influence can be appropriately scaled for the particular zoom level of the geographic image.

The matching of the feature can be performed in either a pixel space associated with the geographic image or in a physical space represented by the geographic image. When matching in the physical space, the zone of influence can be parameterized by the visual scale of the geographic image. By matching features in physical space, costs and resources associated with transforming all data to the pixel space for purposes of matching can be avoided. In a client-server implementation where the matching is performed by a server, this can allow the server to support an increased number of clients providing point of query requests.

At (308), the method can include obtaining information associated with the identified feature. For instance, the information associated with the feature can be accessed from a local memory or the information can be fetched from a remote computing device, such as a server used to host a geographic information system. Once the information associated with the identified feature has been obtained, the method can include presenting the information in the user interface (210). For instance, the information associated with the identified feature can be presented in the information window 114 of the user interface 100 depicted in FIG. 1. In this manner, the method (200) can present relevant information responsive to a user input at a point of query to the user, irrespective of the scale of the geographic image.

Example Methods of Presenting Information Associated with a Mobile Device Location FIG. 4 depicts a flow diagram of an example method (400) of presenting information associated with a mobile device location according to an example embodiment of the present disclosure. The method (400) can be implemented by one or more computing devices, such as one or more of the computing devices depicted in FIG. 7.

At (402), the method includes obtaining a mobile device location. For instance, a mobile device location can be determined for a mobile device using a positioning system (e.g. a GPS system or other suitable positioning system). The mobile device location can be associated with a level of uncertainty. For instance, positioning systems can be able to determine the position of a mobile device to within varying levels of uncertainty under differing circumstances.

At (404), a request can be received for information at a point of query associated with the mobile device location. For instance, a request to obtain information about a user's current mobile device location can be received via a suitable user interface. For instance, a user can interact with the mobile device in a manner signifying that the user would like more information about the user's current mobile device location.

At (406), the method includes accessing a geographic image having a zoom level corresponding to the level of uncertainty of the mobile device location. More particularly, a geographic image can be accessed, for instance, from a geographic information system, that has a visual scale corresponding to the level of uncertainty associated with the mobile device location. For instance, more accurate mobile device locations can correspond to a geographic image having a small visual scale (e.g. a more zoomed-in scale). Less accurate mobile device locations can correspond to a geographic image having a larger visual scale (e.g. a more zoomed-out scale).

At (408), the method can include identifying or matching a feature associated with the point of query. More particularly, a feature associated with the point of query can be identified based on one or more zones of influence of features depicted in the geographic image. If the point of query is within the zone of influence of the particular feature, information associated with the particular feature can be ranked or prioritized higher relative to other information for responding to the request at the point of query. The zone of influence of a particular feature can be defined in a pixel space by a pixel threshold (e.g. 10 pixels). The pixel threshold can remain constant across a plurality of zoom levels for the geographic image corresponding to different levels of uncertainty of the mobile device location. As discussed above, the matching of the feature can be performed in either a pixel space associated with the geographic image or in a physical space represented by the geographic image.

At (410), the method can include obtaining information associated with the identified feature. For instance, the information associated with the feature can be accessed from a local memory or the information can be fetched from a remote computing device, such as a server used to host a geographic information system. Once the information associated with the identified feature has been obtained, the method can include presenting the information in the user interface (412).

Figure 7:
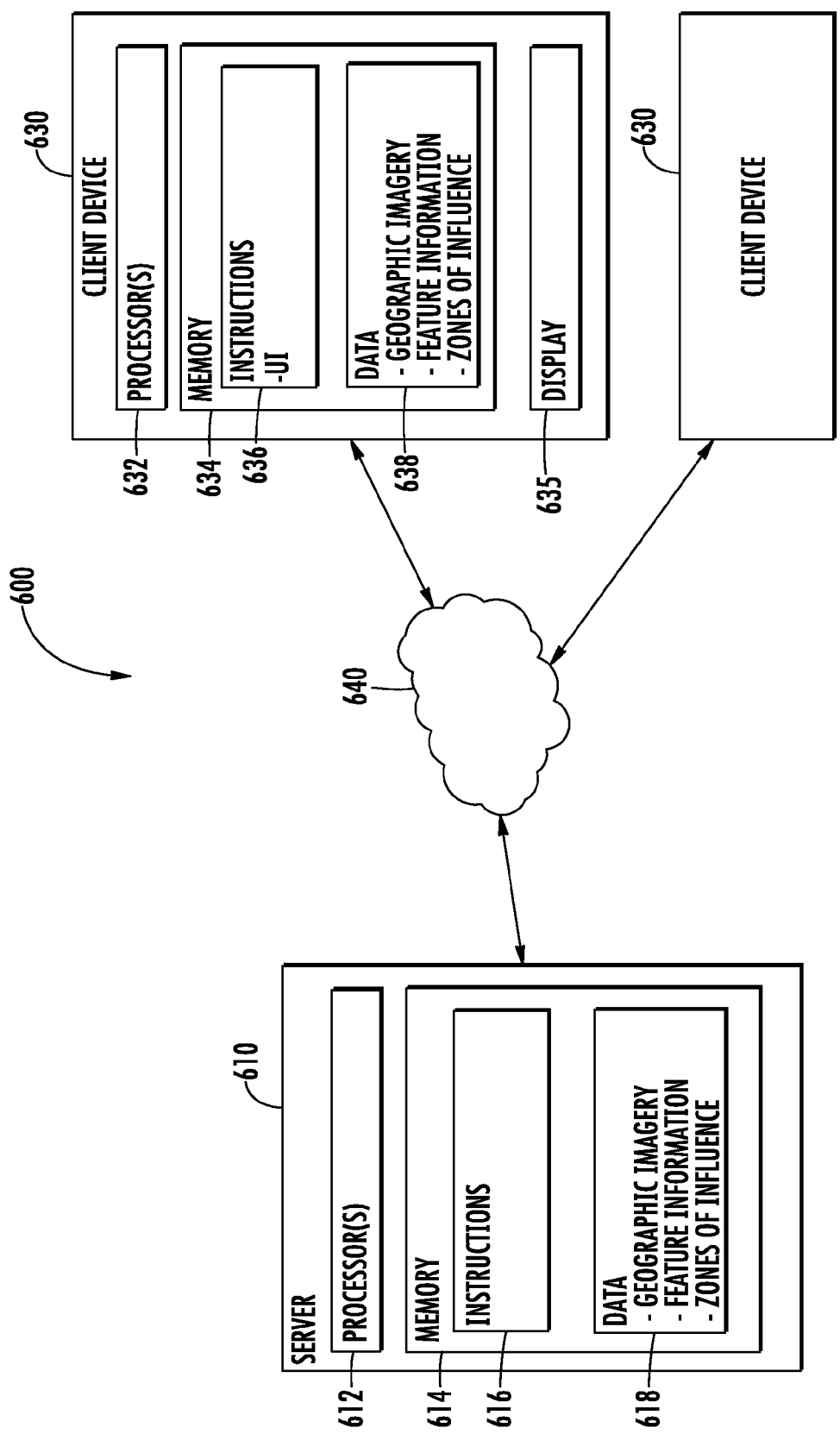
FIG. 7 depicts an example computing system according to example embodiments of the present disclosure.

Example Computing System for Presenting Information Associated with Geographic Imagery FIG. 7 depicts a computing system 600 that can be used to implement the methods and systems according to example aspects of the present disclosure. The system 600 can be implemented using a client-server architecture that includes a server 610 that communicates with one or more client devices 630 over a network 640. The system 600 can be implemented using other suitable architectures, such as a single computing device.

The system 600 includes a server 610, such as a web server. The server 610 can host a geographic information system. The server 610 can be implemented using any suitable computing device(s). The server 610 can have one or more processors 612 and memory 614. The server 610 can also include a network interface used to communicate with one or more client devices 630 over a network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, logic device, or other suitable processing device. The memory 614 can include one or more computer-readable media, including, but not limited to, tangible non-transitory computer-readable media, RAM, ROM, hard drives, flash drives, or other memory devices. The memory 614 can store information accessible by the one or more processors 612, including instructions 616 that can be executed by the one or more processors 612. The instructions 616 can be any set of instructions that when executed by the one or more processors 612, cause the one or more processors 612 to provide desired functionality. For instance, the instructions 616 can be executed by the one or more processors 612 to implement one or more modules configured to implement various aspects of any of the methods disclosed herein.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media. When software is used, any suitable programming language or platform can be used to implement the module.

Memory 614 can also include data 618 that can be retrieved, manipulated, created, or stored by the one or more processors 612. The data 618 can include geographic imagery, information associated with features depicted in the geographic imagery, information defining zones of influence of features in a pixel space using a constant pixel threshold across multiple zoom levels, and other information. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 7, any number of client devices 630 can be connected to the server 610 over the network 640. The client devices 630 can be any suitable type of computing device, such as a general purpose computer, special purpose computer, laptop, desktop, mobile device, smartphone, tablet, wearable computing device, a display with one or more processors, or other suitable computing device.

Similar to the server 610, a client device 630 can include one or more processor(s) 632 and a memory 634. The one or more processor(s) 332 can include one or more central processing units (CPUs), graphics processing units (GPUs) dedicated to efficiently rendering images, and/or other processing devices. The memory 634 can include one or more computer-readable media and can store information accessible by the one or more processors 632, including instructions 636 that can be executed by the one or more processors 632 and data 638. For instance, the memory 634 can store instructions 636 for implementing a user interface and a mapping application for a geographic information system. The memory 634 can also store instructions 636 for implementing various aspects of any of the methods disclosed herein.

The client device 630 of FIG. 7 can include various input/output devices for providing and receiving information from a user, such as a touch screen, touch pad, data entry keys, speakers, and/or a microphone suitable for voice recognition. For instance, the client device 630 can have a display 635 for presenting geographic imagery of a geographic area to a user.

The client device 630 can further include a positioning system. The positioning system can be any device or circuitry for determining the position of a client device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), cellular network, or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of presenting information in conjunction with a point of query, comprising:

receiving, by one or more computing devices, a user input at a point of query, the point of query associated with a mobile device location depicted in a geographic image, the geographic image comprising a plurality of pixels with a plurality of zoom levels scaled according to a level of uncertainty associated with the mobile device location, wherein a zoom level of the plurality of zoom levels increases inversely in relation to the level of uncertainty;

responsive to the point of query being within a zone of influence encompassing a feature of a plurality of features, obtaining, by the one or more computing devices, information associated with the feature, the zone of influence defining a region in the geographic image depicting the feature such that information associated with the feature is returned responsive to the user input at the point of query, the zone of influence being defined independent of the point of query;

ranking, by the one or more computing devices, the information associated with the feature higher, relative to other information associated with other features of the plurality of features, when the point of query associated with the feature is encompassed by the zone of influence; and providing for display, by the one or more computing devices, the information associated with the feature in a user interface, wherein one or more boundaries of the zone of influence are defined by a pixel threshold in a pixel space associated with the geographic image such that the zone of influence defines a subset, of the plurality of pixels of the geographic image, the pixel threshold being defined irrespective of a scale of the geographic image, such that the pixel threshold remains constant irrespective of the scale.

2. The computer-implemented method of claim 1, wherein the pixel threshold is constant across the plurality of zoom levels of the geographic image.

3. The computer-implemented method of claim 1, wherein obtaining, by the one or more computing devices, information associated with a feature located proximate to the point of query comprises prioritizing information associated with the feature relative to information associated with a different feature, the different feature having a zone of influence that does not encompass the point of query.

4. The computer-implemented method of claim 1, wherein the method comprises presenting the geographic image in the user interface.

5. The computer-implemented method of claim 4, wherein the point of query comprises a user interaction at a point depicted in the geographic image.

6. The computer-implemented method of claim 4, the geographic image is presented at a first zoom level.

7. The computer-implemented method of claim 6, wherein the method further comprises presenting the geographic image at a second zoom level, the zone of influence of the feature having a constant pixel threshold for the first zoom level and the second zoom level.

8. A computing system, comprising:
one or more processors; and
one or more computer-readable media, the one or more computer-readable media storing computer-readable instructions that when executed by the one or more computer-readable media cause the one or more processors to perform operations, the operations comprising:
receiving a user input at a point of query, the point of query associated with a mobile device location depicted in a geographic image, the geographic image comprising a plurality of pixels with a plurality of zoom levels scaled according to a level of uncertainty associated with the mobile device location, wherein a zoom level of the plurality of zoom levels increases inversely in relation to the level of uncertainty;
responsive to the point of query being within a zone of influence encompassing a feature, obtaining information associated with the feature, the zone of influence defining a region in the geographic image depicting the feature such that information associated with the feature is returned responsive to the user input at the point of query, the zone of influence being defined independent of the point of query;
ranking, by the one or more computing devices, the information associated with the feature higher, relative to other information associated with other features of the plurality of features, when the point of query associated with the feature is encompassed by the zone of influence; and
providing for display the information associated with the feature in a user interface,
wherein one or more boundaries of the zone of influence of the feature are defined by a pixel threshold in a pixel space associated with the geographic image such that the zone of influence defines a subset of the plurality of pixels of the geographic image, the pixel threshold being defined irrespective of a scale of the geographic image, such that the pixel threshold remains constant irrespective of the scale.

9. The computing system of claim 8, wherein the pixel threshold is constant across the plurality of zoom levels of the geographic image.

10. The computing system of claim 8, wherein the computing system comprises presenting the geographic image in the user interface.

11. The computing system of claim 10, wherein the point of query comprises a user interaction at a point depicted in the geographic image.

12. One or more tangible non-transitory computer-readable media storing computer readable instructions that when executed by one or more processors cause the one or more processors to perform operations, the operations comprising:
providing for display a geographic image associated with a mobile device location at a first zoom level in a user interface displayed on a display device, the geographic image depicting at least one feature at the first zoom level, the geographic image comprising a plurality of pixels with a plurality of zoom levels scaled according to a level of uncertainty associated with the mobile device location, wherein a zoom level of the plurality of zoom levels increases inversely in relation to the level of uncertainty;
ranking, by the one or more computing devices, the information associated with the feature higher, relative to other information associated with other features of the plurality of features, when the point of query associated with the feature is encompassed by the zone of influence; and
providing for display the geographic image at a second zoom level in the user interface, the geographic image depicting the at least one feature at the second zoom level,
wherein the at least one feature is associated with a zone of influence defining a region in the geographic image associated with the feature, and wherein one or more boundaries of the zone of influence of the at least one feature are defined by a pixel threshold, the zone of influence defining a subset of the plurality of pixels of the geographic image, the pixel threshold remaining constant across the first zoom level and the second zoom level, the zone of influence being defined independent of a user interaction with the geographic image.

13. The one or more tangible non-transitory computer-readable media of claim 12, wherein upon receiving a user interaction at a point of query within the zone of influence, the operations comprise providing for display information associated with the feature in the user interface.

14. The one or more tangible non-transitory computer-readable media of claim 13, wherein the operations comprise obtaining the information associated with the feature based at least in part on prioritizing the information associated with the feature relative to information associated with a different feature, the different feature having a zone of influence that does not encompass the point of query.

* * * * *